Figure 1:
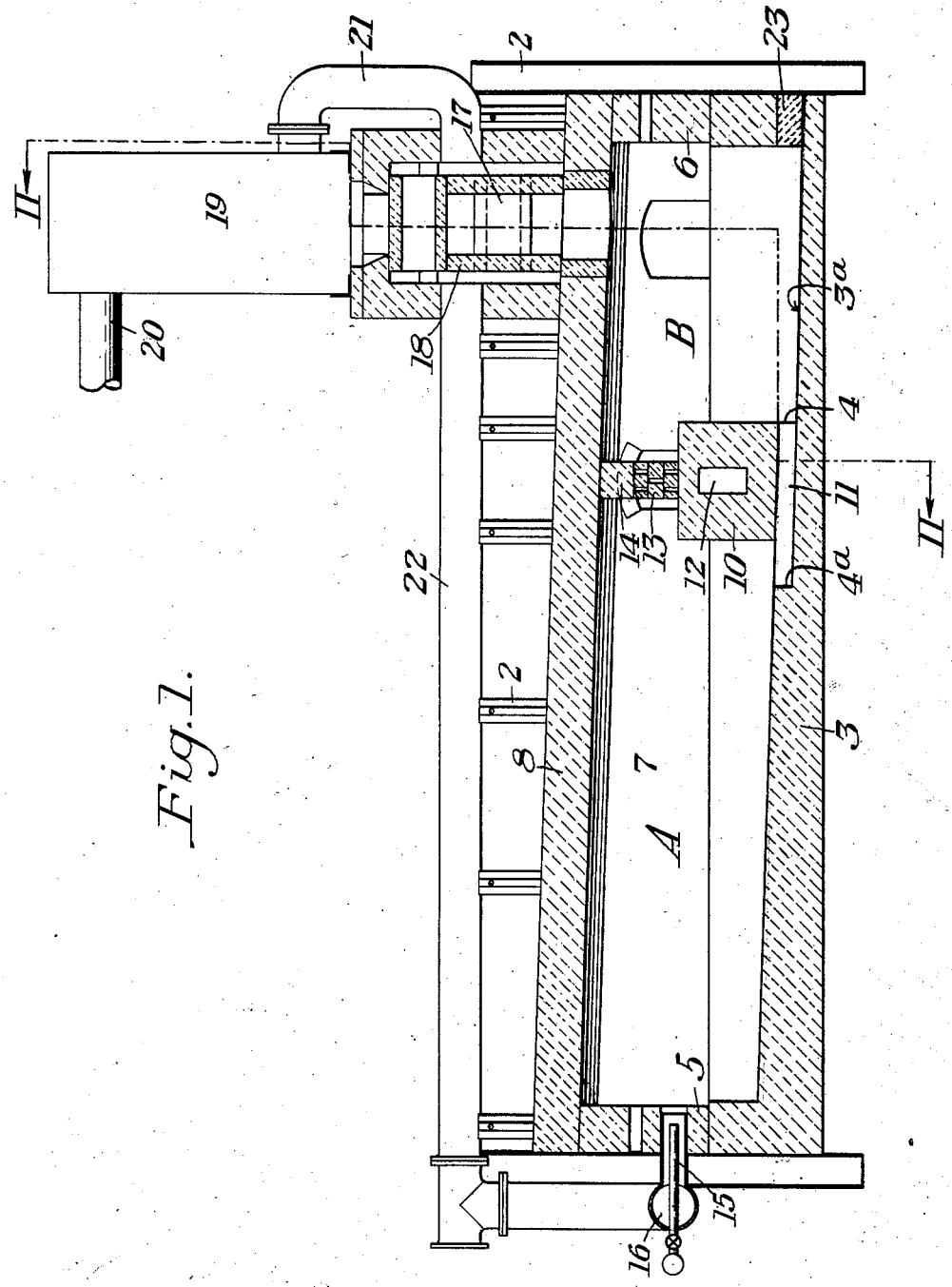

Oct. 18, 1932.  E. E. SLICK  1,883,023
GLASS FURNACE
Filed May 11, 1926  2 Sheets-Sheet 1

INVENTOR
Edwin C. Slick,
by Byrnes, Stebbins & Parmelee
his attys.

Oct. 18, 1932.          E. E. SLICK          1,883,023
                        GLASS FURNACE
                     Filed May 11, 1926          2 Sheets-Sheet 2

INVENTOR
Edwin C. Slick,
By Byrnes, Stebbins & Parmelee,
his attys.

Patented Oct. 18, 1932

1,883,023

UNITED STATES PATENT OFFICE

EDWIN E. SLICK, OF PITTSBURGH, PENNSYLVANIA

GLASS FURNACE

Application filed May 11, 1926. Serial No. 108,299.

The present invention relates broadly to the art of glass working, and more particularly to improved furnace structures whereby advantages both with respect to operation of the furnace and with respect to the quality of the finished ware produced are obtained.

In accordance with usual practice, glass furnaces are of comparatively large dimensions requiring a considerable period of time for the proper melting down of the batch and also presenting serious problems with respect to vitrification of the glass and proper changing of the glass body in the event colored glass is being worked and a change in the color or character of the glass becomes desirable.

While certain of the difficulties experienced in this connection are eliminated by the use of so-called day-tanks, experience has shown that such tanks are objectionable in that they do not provide a working or refining zone in which the entire body of glass is at a uniform temperature, this being particularly true by reason of the fact that there is no provision for effecting a substantially uniform movement of the body of glass within the working or refining zone. This results in poor distribution of metal in the finished ware and in cords or other defects therein. Furthermore, so-called day-tanks have been objectionable by reason of the loss of time incident to their operation, it being well understood in the art that the filling and melting down period with such constructions represent a greater time interval than the actual period during which the glass therefrom is being worked.

With furnaces of large capacity, although continuity of operation is made possible, flexibility of operation with respect to changes in the character or color of the glass or in the amount of glass being handled to supply different demands is not possible.

The present invention has, for certain of its objects, the provision of a furnace which may be utilized individually to replace so-called day-tanks or furnaces, if desired, and which may be used in groups to replace the so-called continuous furnaces.

Other objects of the present invention are to provide a furnace in which effective heat transfer between the heating medium and the batch or glass is insured, whereby the melting down period is shortened, enabling the melting down to be carried on continuously in accordance with the demands and whereby temperature conditions in the molten glass are maintained more nearly uniform.

Still other objects of the present invention are to provide in a furnace of relatively small capacity, means insuring such a movement of the glass as to effectively prevent the formation of dead space or pockets of glass, and thereby insuring a body of glass within the working or refining zone having such characteristics that high grade finished ware may be obtained therefrom.

A still further object of the present invention is to provide a furnace structure in which the glass and the heating medium travel continuously and in the same direction and in which provision is made for quickly and expeditiously effecting a change in the body of glass within the furnace.

A still further object of the invention is to provide a furnace having a melting chamber and a working or refining chamber having connections therebetween for the effective passage of glass and having separate and preferably restricted communication for the passage of combustion gases from which the major portion of the heat has been abstracted.

In the accompanying drawings there is shown for purposes of illustration only, one embodiment of the present invention, it being understood that the drawings do not define the limits of my invention as changes in the construction and operation disclosed therein may be made without departing either from the spirit of the invention or the scope of my broader claims.

Figure 2:
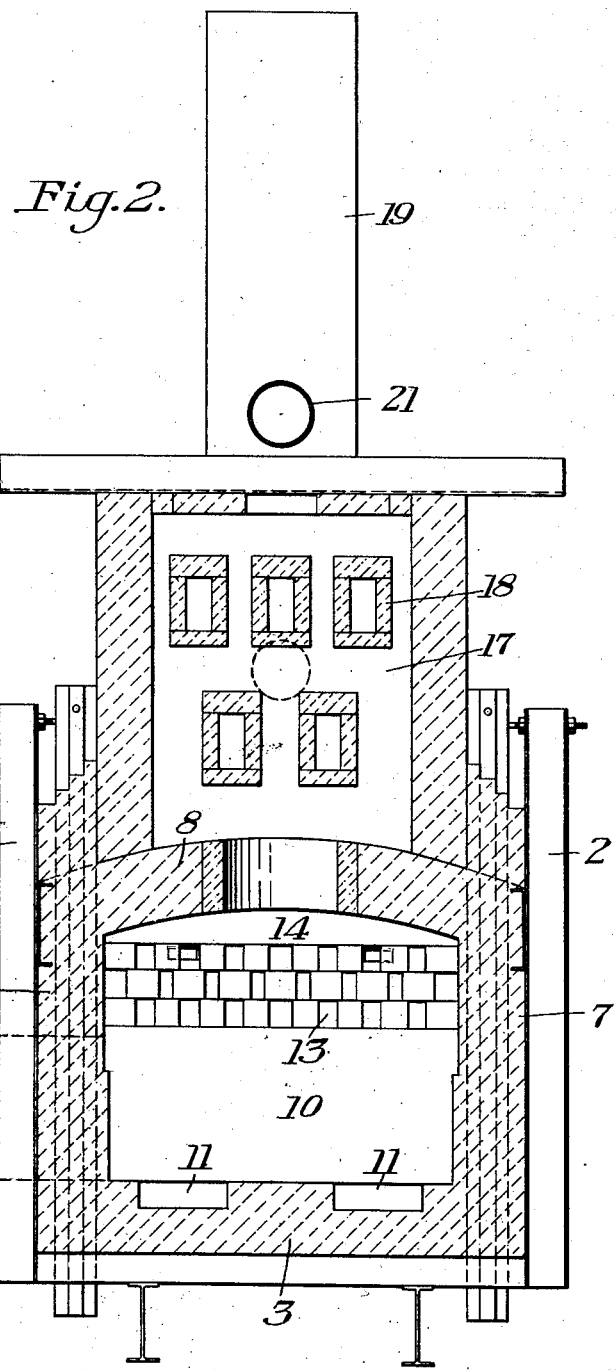

In the drawings,

Figure 1 is a longitudinal, vertical sectional view through a furnace embodying the present invention, certain parts thereof being shown in elevation, and Figure 2 is a transverse vertical sectional view on the line II—II of Figure 1 looking in the direction of the arrows.

In carrying out the present invention there may be provided a structural frame work 2 of any desired type adapted to support the furnace which in turn, is constructed of the usual refractory materials. The furnace may be of any desired contour but is herein illustrated as being substantially rectangular in shape.

A furnace constructed in accordance with the present invention preferably comprises a melting chamber A and a working or refining chamber or zone B. Inasmuch as it is desired, in the operation of the furnace, to obtain a gradual and substantially uniform flow of glass from the melting chamber toward and preferably completely through the working or refining chamber, the bottom 3 is inclined throughout at least the major portion of its length, and provided at an intermediate portion with an offset 4. While the drawings show the bottom of the furnace as being horizontal, the furnace when set on its foundation has its working end lower than its melting end so as to impart a slope to the bottom. Cooperating with the bottom is a rear wall 5, a front wall 6 and side walls 7. The top 8 of the furnace may be carried in any desired manner and is preferably of arched construction as shown in the drawings. Adjacent the rear of the furnace, and preferably laterally offset with respect to the working chamber is a dog house 9 into which the batch and cullet are charged.

The division of the furnace into a melting zone and a working or refining zone may be accomplished by means of a transverse bridge wall 10 resting on the furnace bottom rearwardly of the offset 4. Heretofore it has been customary in furnace structures to provide a single throat of either the straight, sunken or submarine type. I have found that such a throat results in a concentrated flow of glass which does not extend the full width of the furnace. Due to this comparatively localized flow path, dead pockets or corners of glass have heretofore been present both in the melting and refining zone. Such a condition is particularly objectionable in the refining zone and frequently results in the presence of cords or other defects as well as uneven distribution of the metal in the finished ware. I have found that this condition may be effectively overcome by the provision of a plurality of throats through which the glass may pass from the melting to the refining zone. In the embodiment illustrated in the accompanying drawings the furnace is shown as provided with two such throats 11 formed by steps 4a in the furnace bottom, whereby the bottoms of the throats are substantially in the plane of the bottom 3a of the refining zone. Conveniently, these throats are located on opposite sides of the center of the furnace whereby a divided flow is provided insuring substantially continuous uniform movement of the glass and successfully preventing the formation of any dead pockets or corners.

If desired, the bridge wall may be provided with means for effecting cooling thereof, such a means being conventionally illustrated herein as comprising a passage 12 extending therethrough for the reception of a cooling medium.

The bridge wall preferably has a height considerably less than the height of the furnace chamber, and carries a refractory checkerwork 13 cooperating with a depending transverse wall 14 and providing a plurality of restricted flow openings between the melting and refining zones.

Leading from the top of the refining chamber, and preferably from the front portion thereof is an offtake flue 17 in which is preferably built a recuperator structure 18 of any desired type. Above the recuperator 18 which may conveniently be constructed of refractory material for resisting the high temperatures to which it is subjected, is a second recuperator 19 which is preferably of heat resistant metal of any well known type available for this purpose. The recuperator 19 is provided with an air inlet 20 and with an outlet 21 communicating with the recuperator 18, whereby air preheated in the recuperator 19 is supplied to the recuperator 18 in which its temperature is raised. This highly heated air may then be conducted from the recuperator 18 to a manifold 16 which supplies air to the burners 15 cooperating with the melting zone.

In actual operation, material charged into the melting zone is quickly melted down by the flame from the burners 15, the flame travel being substantially limited and combustion being substantially completed within the chamber A by reason of the checkerwork 13 and the restricted openings therein. As will be apparent from the drawings, the melting chamber is of such construction that a comparatively shallow body of glass is present therein, whereby effective heating of the entire body is insured. The glass in molten condition and at the proper temperature passes continuously into the refining zone in a plurality of paths as referred to, whereby the entire body of glass is kept in effective motion preventing dead pockets or corners with their objectionable characteristics. In the refining zone the glass is maintained at the desired temperature largely by heat radiated thereto. The burned gases or products of combustion passing through the checkerwork 13 to the recuperators 18 and 19 effectively give up a large portion of their heat to the incoming air whereby the temperature of the gases is reduced and the air effectively preheated. In this manner heat, which would otherwise be wasted through the flue, is effectively reclaimed.

By providing a plurality of furnaces of the character disclosed herein, flexibility of operation in accordance with demands is obtainable, as the number of furnaces in operation at any one time may be increased or decreased as required. Also, any one of the furnaces is adapted to have its contents quickly emptied whereby a change in the character or color of the glass being handled may be effected. This is obtainable, as illustrated herein, by the provision of a removable plug or closure 23 located adjacent the lower portion of the furnace whereby removal of the plug insures a complete and expeditious emptying of any glass remaining therein.

It will be noted that the flow of hot glass and gases through the furnace is also in the same direction and that practically all combustion is effected in the melting chamber A where the most intense heat is required. Such an operation greatly increases the efficiency of the furnace and insures the utilization of the greatest amount of available heat in the fuel.

One of the advantages of the present invention arises from the provision of a furnace in which it is possible to keep the entire body of glass in motion and in which the glass and the combustion of gases at all times travel in the same direction.

Another advantage of the present invention arises from a construction of such nature that the provision of channels, pockets or corners of glass at different temperatures is obviated and the quality of the finished ware is improved by the elimination of cords and similar defects and by a more uniform distribution of the metal therein.

Still another object of the present invention arises from the provision of a furnace of relatively small capacity effectively provided with a working chamber and a refining chamber so separated as to insure more effective control of the travel both of the glass and of the combustion gases from one chamber to the other.

A still further advantage of the present invention arises from the provision of a construction such that expeditious emptying of the furnace by the removal of a plug or other controlling means is permitted.

Still another advantage of the present invention arises from the provision of a furnace having an offset intermediate its ends whereby a refining chamber at a lower level than the melting chamber and lending itself to the working out of a large portion of the molten glass before draining is provided.

I claim:

1. A glass furnace having an interior chamber divided by a transversely extending bridge wall into a melting chamber and a gathering chamber, a throat in the floor of the furnace under the bridge wall for establishing communication between the two chambers, the floor of the furnace being continuously inclined from one end to the other and having a vertical step therein adjacent the bridge wall.

2. In a glass furnace, a furnace chamber having a bridge wall extending transversely thereof, a restricted passage over the bridge wall through which the products of combustion pass from the chamber at one side of the bridge wall to the chamber at the other side of the bridge wall, a throat under the bridge wall, a burner at one end of the furnace chamber on one side of the bridge wall, and a flue leading out of the other end of the chamber at the other side of the bridge wall.

3. In a glass furnace, a furnace chamber having a bridge wall transversely thereof, a restricted passage over the bridge wall through which the products of combustion pass from the chamber at one side of the bridge wall to the chamber at the other side of the bridge wall, a throat under the bridge wall, a burner at one end of the furnace chamber on one side of the bridge wall, a flue leading out of the other end of the chamber at the other side of the bridge wall, a recuperator associated with the flue, and an air passage leading from the recuperator to the burner for providing heated air to the burner.

4. In the glass furnace, a furnace chamber having an inclined bottom, a step between the forward and rear portions of the bottom, a bridge wall set on the bottom adjacent the step, and a throat in the bottom of the tank under the bridge wall, said throat being flush with the floor of the tank on one side of the bridge wall and being below the level of the bottom on the other side of the bridge wall, and a gas passage over the top of the bridge wall between the two ends of the furnace chamber.

5. In a glass furnace, a furnace chamber having an inclined bottom, a step between the forward and rear portions of the bottom, a bridge wall set on the bottom adjacent the step, a throat in the bottom of the tank under the bridge wall, said throat being flush with the floor of the tank on one side of the bridge wall and being below the level of the bottom on the other side of the bridge wall, and a gas passage over the top of the bridge wall between the two ends of the furnace chamber, said passage having a checkerwork of brick therein and also having a transversely extending baffle therein whereby the flow of glass from one end of the furnace chamber to the other is impeded.

6. In a glass furnace, a furnace chamber having a continuously inclined floor with a step therein, a bridge wall on the floor of the furnace adjacent the step, a throat under the bridge wall in the floor of the furnace, and a drain port in the wall of the furnace at the front end thereof on the floor level of the furnace.

7. A glass furnace including a furnace structure having a chamber therein separated into forward and rear portions, a bridge wall between the two portions and serving to separate them, a checkerwork on the bridge wall between the top of the bridge wall and the roof of the furnace, said checkerwork providing a restricted passage between the two parts of the chamber above the bridge wall, the bottom of the furnace being continuously inclined toward the forward end, a plurality of throats under the bridge wall in the bottom of the furnace, the forward ends of the throats being flush with the bottom of the furnace and the rear ends of the throats being below the bottom of the furnace, and a drain plug in the front wall of the furnace on the level of the forward-most end of the floor.

8. In a glass furnace, a furnace chamber having a bottom, side walls, front and rear end walls, and a top wall, a bridge wall intermediate the ends of the chamber extending transversely there-across a dividing wall on the bridge wall between the top of the bridge wall and the roof of the chamber, said dividing wall having a restricted passage-way therethrough through which gases may circulate from one part of the chamber to the other, a throat in the bottom of the furnace under the bridge wall connecting the two parts of the chamber, a burner in the rear wall of the chamber, and an outlet flue in the forward end of the chamber.

9. In a glass furnace, a furnace chamber having a bottom, side walls, front and rear end walls, and a top wall, a bridge wall intermediate the ends of the chamber extending transversely there-across, a dividing wall on the bridge wall between the top of the bridge wall and the roof of the chamber, said dividing wall having a restricted passage way therethrough through which gases may circulate from one part of the chamber to the other, a throat in the bottom of the furnace under the bridge wall connecting the two parts of the chamber, a burner in the rear wall of the chamber, and an outlet flue in the forward end of the chamber, the depth of the forward end of the chamber most remote from the burner being greater than the depth of the rear portion of the chamber back of the bridge wall.

10. In a continuous glass furnace, a working chamber, a refining chamber, said working chamber being lower than the refining chamber a burner at the back of the refining chamber and a flue at the front of the working chamber, and a bridge wall separating said chambers, said bridge wall having a plurality of openings at the bottom thereof for the passage of glass, and a plurality of openings at the top thereof for the passage of products of combustion.

11. In a continuous glass furnace, a working chamber, a refining chamber, said working chamber being in a plane lower than the refining chamber a burner at the back of the refining chamber and a flue at the front of the working chamber, and a bridge wall separating said chambers, said bridge wall having a plurality of openings at the bottom thereof for the passage of glass, and a plurality of openings at the top thereof for the passage of products of combustion, said last mentioned openings providing a restricted flow area for the combustion gases to insure completion of combustion within the working chamber.

12. In a continuous glass furnace of the type wherein new materials are introduced at one end of the furnace and finished glass removed from the other end, having a melting chamber and a working chamber, and a transverse bridge wall separating the chambers, said wall having an opening therein adjacent the bottom of the furnace through which glass may flow from one chamber to the other, said bridge wall having openings in the upper portion thereof and being adapted to restrict the flow of gases from one chamber into the other, a burner in the melting chamber, and a flue passage leading out of the working chamber, the restriction of the gases of combustion by the bridge wall causing combustion to be more completely effected in the melting chamber and causing the working chamber to be maintained at a lower temperature than the melting chamber, the bottom of the working chamber being dropped below the bottom of the melting chamber, and a drain in the working chamber, the bottom of the entire furnace sloping toward said drain.

In testimony whereof I have hereunto set my hand.

EDWIN E. SLICK.